Oct. 24, 1933.    J. C. SCHELLENG    1,931,853
RADIO DIRECTION FINDING
Filed Aug. 23, 1929
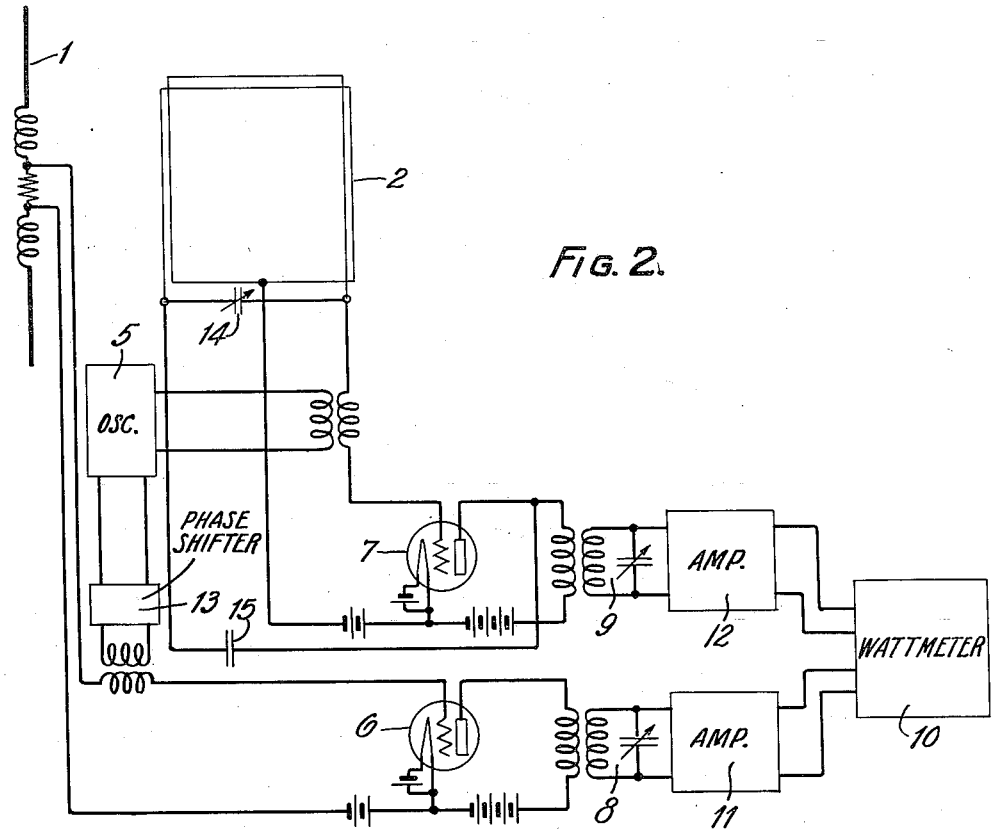
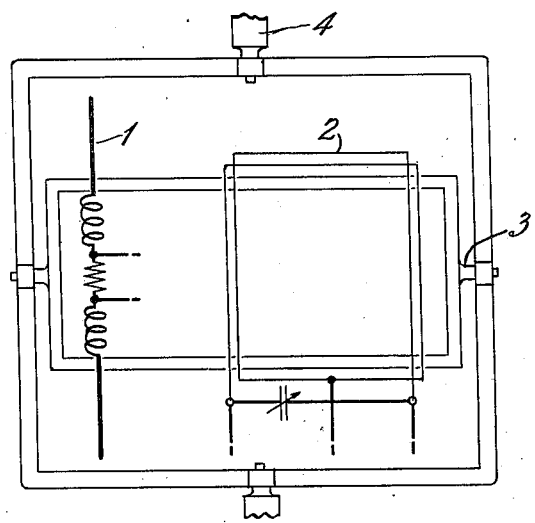
INVENTOR
J. C. SCHELLENG
BY Guy T. Morris
ATTORNEY Patented Oct. 24, 1933

1,931,853

UNITED STATES PATENT OFFICE 1,931,853

RADIO DIRECTION FINDING

John C. Schelleng, Millburn, N. J., assignor to Bell Telephone Laboratories, Incorporated, New York, N. Y., a corporation of New York Application August 23, 1929. Serial No. 387,826

7 Claims. (Cl. 250—11)

This invention relates to radio direction finding, that is, to methods or means whereby a given radio station may determine the direction of another radio station. It especially relates to methods or means whereby the direction of a given radio transmitting station may be substantially determined by a determination of the direction of incidence of radio waves emanating from it on a receiving radio station.

An object of the invention is to insure greater accuracy than by prior methods or means, in the determination of the direction of incidence of a radio wave on a receiving station.

A more particular object is to determine such direction of incidence without reference to the direction of the electric vector at the incident station and without detriment to accuracy due to deviation of the direction of such vector from the vertical or from its initial direction, as attends the operation of similar direction finding systems.

A feature of the invention by reason principally of which these and other objects are achieved relates to the use of the energy (Poynting) vector as the reference quantity in the direction determination, this vector, by definition, indicating the direction of wave propagation in the ether.

In general there are three representative characteristics of an ether wave which may be made use of in determining the direction of incidence of such a wave on a receiving station, namely the electric, magnetic and energy characteristics. These characteristics are interdependent as shown by classical treatments of electromagnetic wave propagation. These quantities may conveniently be represented graphically by vectors.

By itself, the electric vector at a point is not useful in determining the direction of propagation of a wave in the earth's plane where, as in the usual case, the electric vector is substantially vertical as results from the use of a vertical transmitting antenna. Although it is known that such vector and the direction of propagation are normal to each other, this fact in the practical case above noted would only define the earth's plane and would indicate nothing of the direction of propagation in that plane. There is an important difference however when the magnetic vector is correspondingly considered, resulting from the known fact that the electric and magnetic vectors and direction of propagation are mutually right-angularly related and still assuming the above-mentioned case where the electric vector is vertical. For this case the resultant determination is definitive of the actual direction of propagation rather than merely of the plane in which the direction vector exists. When the electical vector of the incident wave is strictly vertical the direction of propagation along a given radius must be in the earth's plane and specifically in the direction of the horizontal vector. Otherwise it must have a component in the earth's plane which would be correspondingly determined by a determination of the direction of the horizontal component of the magnetic vector. This has therefore been the customary method of direction finding.

The difficulty in these prior methods is to obtain an accurate determination of the direction of this horizontal component of the magnetic vector. For example, it is well-known that with the conventional loop rotatable about a vertical axis a null reading is not necessarily obtainable for any position of the loop. Thus, for example, as will be explained in detail later, under circumstances where a rotation of the plane of polarization is combined with a downward component of the direction of propagation, a null position will not be found with the plane of the vertical loop perpendicular to the direction of arrival in the horizontal plane. This follows from the resultant dissymmetry between the electromotive forces generated in the upper and lower sides of the loop. Furthermore, by reason of this dissymmetry, a minimum reading does not indicate that the plane of the loop is parallel to the direction of the magnetic vector or therefore normal to the direction of propagation. The method or system of the invention avoids this error.

A mathematical expression for the component of the energy vector in any given direction in the earth's plane is readily derived, this direction determining one axis in terms of the corresponding electric and magnetic vector components with respect to the other two coordinate axes. In the application of the mathematical expressions to the present invention this axis is chosen so as to have a definite relation to the direction of propagation of the wave. The expression is the difference of two products of electric and magnetic components.

The measurements of the electric and magnetic components along the two axes required by the expression are therefore easily accomplished by open and loop antennæ. The products of the two may be determined by a wattmeter type of device. The receiving structure consists simply of a linear antenna and a loop antenna rigidly connected together so as to be coplanar and capable of rotation, the whole rotatable about both a vertical and a horizontal axis. The technique of operation requires readings of the products of the electric and magnetic components for vertical and horizontal positions of the antennæ in order to determine therefrom the position of the horizontal axis corresponding to the direction of arrival of the wave.

The system possesses the advantage that no attention need be paid to the polarization of the waves or to their direction in the vertical plane. The presence of the earth near the apparatus does not introduce any difficulty and the existence of a wave reflected from the earth, in addition to the normal one, is taken into account.

Other objects and features of the invention will appear from the following detailed description taken in connection with the accompanying drawing; in which Fig. 1 discloses an antenna mounting means whereby the combination of open and loop antennae of the invention may, as a unit, be orientated about two right-angularly related axes; and Fig. 2 discloses a system as a whole embodying the invention, including certain portions of the disclosure of Fig. 1 diagrammatically.

Preliminary to a description of the mechanism and procedure by which the invention is practiced, an analysis of the theoretical principles upon which the invention is based, and which is required in order to intelligently practice the invention, will be undertaken.

The invention involves a means for determining the direction of the Poynting vector, that is, the vector representing the direction of flow of energy in the ether. While the other two representative vectors that are useful in defining a wave, namely, the electric and magnetic field vectors, may be used in the determination of direction of propagation, since their directions have a relation thereto, it is well known, and it will be shown later, that errors are introduced in their usage under certain circumstances. The determination of the direction of the Poynting vector incontrovertably establishes the direction of propagation of the wave and therefore its direction of arrival at a receiving station independently of the conditions which cause errors in prior alternative methods.

In vector notation, the electric and magnetic fields of an ether wave may be expressed as follows:

$$E = iE_x + jE_y + kE_z$$
$$H = iH_x + jH_y + kH_z$$

These equations represent the total field due to the incident and reflected waves. In them the quantities E and H respectively represent, as is customary, the electric and magnetic fields, the subscripts $x$, $y$ and $z$, indicating the axes along which the accompanying field values are taken, and the coefficients $i$, $j$ and $k$ being numerical constants.

The Poynting vector, since it is a measure of the total wave energy, is measured by the vector product of the above equations. This product may be indicated, in determinant form, as follows:

$$E \times H + E_x E_y E_z = \begin{matrix} ijk + i(E_y H_z - E_z H_y) \\ + j(E_z H_x - E_x H_z) \\ HHH + k(E_x H_y - E_y H_x) \end{matrix}$$

If the "$y$" axis is taken perpendicular to the surface of the earth, then, from the next above equation, the net flow of energy vertically is $$E_x H_z - E_z H_x$$

This component of the energy flow discloses nothing with regard to the direction of arrival of the wave at a given point in the equatorial plane and hence it need not be further considered. That is, direction finding apparatus should not be affected by it.

Correspondingly, the flow of energy in the "$z$" direction is given by $E_x H_y - E_y H_x$, and the flow of energy in the "$x$" direction by $E_y H_x - E_x H_y$.

If we consider our system of axes to rotate about the "$y$" axis as we rotate the direction finding apparatus, and if we find the position which makes the "$z$" energy flow zero, then "$x$" is the true direction of arrival. This convention will be used throughout the remainder of the specification. As in accordance with this invention, in designing apparatus for measuring the direction of propagation, we should have means of measuring the quantity $E_x H_y - E_y H_x$ or of finding a null position for this quantity. In general, $E_x H_y \neq o$ and $E_y H_x \neq o$.

It is readily deducible and is well understood in the art that although apparatus which indicates that the energy flow in the "$z$" direction is zero may be used to indicate the true direction of propagation, the direction cannot be accurately indicated under all circumstances by the use of a loop alone, such as has been customarily used to determine the direction of the horizontal component of the magnetic field.

In proof of the last statement above, consider the practical case where the wave front has a tilt from the vertical as may be due to propagation upwardly against, and reflection from, the ionized layer of atmosphere. Consider also, in conjunction with the above, the phenomenon which occurs almost universally in practice, of the rotation of the plane of polarization, such as may be caused, for example, by the earth's magnetic field. The resultant effect, so far as concerns the present invention, is the existence of a horizontal electric field perpendicular to the direction of propagation in the horizontal plane. This component will have no effect on the vertical conductors of a loop, which will be, under these circumstances, still perpendicular to it. However, this horizontal component will introduce an electromotive force into the horizontal portions of the loop when the loop is in a plane perpendicular to the direction of arrival of the wave, and therefore in a position usually taken to indicate the direction of incidence. In the practical operation of the loop to obtain a null position, the loop will be rotated about its vertical axis until the electromotive forces generated in the vertical sides are such as to compensate for the electromotive forces generated as above in the horizontal portions. This means that in the null position of the loop, the normal to the plane of the loop will no longer point toward the distant station, the variation from the direction of that station being a measure of the bearing error.

The two figures of the drawing disclose a type of apparatus which may be manipulated in such a way as to determine the direction in which the quantity $E_x H_y - E_y H_x$, given above, is zero, and hence a position normal to the direction of propagation.

The apparatus employs an open antenna 1 in conjunction with a loop antenna 2 coplanar therewith, or at least occupying a plane parallel therewith. The open antenna gives a response, for a given frequently, numerically proportional to the component of electric field E in its direction of extension, and correspondingly, the loop antenna gives a response, for a given frequency, numerically proportional to the magnetic field H perpendicular to its plane. As a result of these types of response, if apparatus is provided which measures the product of the output of the loop and open antennæ, there will result an indication which, if the antenna system is properly orientated, represents either term in the above Poynting vector expression $E_xH_y - E_yH_x$. This makes possible, by the measurement of two such products corresponding to two right-angularly related orientations of the system about an axis the position of which corresponds to the Z direction desired, the ascertainment of the value of the Poynting vector in such direction.

In one practical embodiment of the invention, and as disclosed in Fig. 1, the open and loop antennæ are rigidly joined together so as to occupy a common plane, which is made capable of rotation about a horizontal axis as above represented by reference numeral 3. This horizontal axis in turn is capable of rotation about a vertical axis represented by reference numeral 4, so that the plane of the antennæ is capable of rotation simultaneously of two right-angularly relates axes.

As in accordance with the procedure in using the above apparatus for determining the direction of propagation by determining the direction of the Poynting vector, the above product of E and H is measured with the horizontal axis 3 fixed, for vertical and horizontal positions of the plane, as by rotation of the plane about the axis 3. These two sets of readings provide a determination of the value of the quantity $E_xH_y - E_yH_x$, aboved discusssed. Successive sets of such readings are taken for different positions of the axis 3, by rotation about axis 4, until a null position for this quantity $E_xH_y - E_yH_x$ has been found. Taking due account of the signs of the magnetic and electric fields which affect the apparatus, it may be readily shown that the algebraic sum of the two readings corresponding to the two positions of the antenna system about the horizontal axis is equal to the corresponding total energy vector for that particular position of the system. With this positioning, the null value indicates that no energy is propagated in the direction of the "z" axis. Accordingly, the direction of propagation is accurately determined as normal to this direction.

An alternative method, which may have some advantage over the one above described on account of the fact that it is not a null method, is as follows: Readings similar to those described above are taken with the horizontal axis in a direction approximately 45° from the direction of propagation. The horizontal axis is then rotated about the vertical axis to a position which gives an equal energy reading. The mean of these two directions is the true direction of propagation.

In order to obtain the product of the output of the two antennæ, it is convenient, although not always necessary, to step down the frequency to a value comparable with that of the currents to which a conventional wattmeter is adapted to respond and to use a sensitive wattmeter, or the like, to measure the product.

The frequency step-down is achieved by means of the oscillator 5, the frequency of whose wave differs from the frequency of the incoming wave by, for example, 100 cycles. The incoming waves derived from the open antenna 1 and loop antenna 2 are combined with the wave from this oscillator in, respectively, detectors 6 and 7, the difference frequency, assumed to be of the order of 100 cycles, being selected by tuned circuits 8 and 9 respectively, and combined in the multiplying device 10 after amplification, if desired, by amplifiers 11 and 12.

Phase shifter 13, which may be interposed between the oscillator and either detector, but which is shown related to the detector 6, insures that the quantities to be eventually combined in device 10 have the requisite phase relation. This relation should be such that the product is a maximum when a known local signal is being received from a horizontal direction. In general the local transmitting source should be at a distance of several wave lengths from the receiver.

It is obvious that the principle of the invention inheres equally as well as in the above described system in a system in which the frequency step-down is dispensed with or in which other types of multiplying devices than those partaking of the characteristics of a conventional wattmeter may be used. Many examples of such type of device are known to the art.

Since combining means 6 and 7 as disclosed merely typify means of which there are many other examples which could be used alternatively, and since, in the form disclosed, their circuits are such as are conventionally used in simple types of detectors, a description of their various elements and associated structure is not necessary, and the same thing is true of the open and loop antennæ. It may be observed, however, that it is a function of the variable condenser 14 associated with the loop to tune the loop to the desired frequency, and that it is a function of the condenser 15 to perfect a symmetry between the loop and combining means 7 so as ultimately to insure an electrostatic balance to ground, so as to avoid what is commonly known as the "antenna effect", that is, to avoid any tendency of the loop to function by virtue of its electrostatic rather than its electromagnetic exposure.

Since the principles of the invention are applicable whether the open antenna actually occupies the plane of the loop or is parallel with said plane but distant from it a small fraction of a wave length, it is desirable in claim drafting to employ a single expression including each of these concepts. Accordingly it should be understood that in the claims an expression of the fact that the open antenna is parallel with the plane of the loop or the like, should be taken to cover all degrees of separation including zero separation and therefore to cover a case where the open antenna is in the plane of the loop.

What is claimed is:

1. The method of radio direction finding which comprises measuring the flow of energy along a reference line and repeating the measurement while the reference line is changed to different directions in the same plane until a direction is found, indicated by a critical value of such measured energy having a known relation to the direction of arrival of the waves.

2. The method of determining the direction of arrival of a wave in a given plane comprising measuring the product of the electric and magnetic fields about two right-angularly related axes in that plane, similarly measuring such product with the directions of said fields interchanged, repeating like sets of measurement for various angular displacements of the system of axes about a vertical axis and determining the angular displacements when the difference of said products is a minimum.

3. The method of the preceding claim in which the given plane is the earth's plane whereby the directions of the axes in said plane for the position of the system of axes corresponding to the minimum difference of said products correctly indicates the direction of propagation of the wave in the earth's plane.

4. The method of direction finding, using an antenna system comprising an open and a loop antenna, which comprises measuring the product of the responses of said antenna to an incoming wave when the open antenna and loop are both vertical, correspondingly measuring such product when said antennæ have the same relation to each other as before, but when the loop has been rotated about an axis normal to the open antenna until it occupies a horizontal plane, observing the difference between the two products, repeating such product measurements and observations for various orientations of the antenna system about the vertical axis, and determining the orientation of the system when the difference between the two products is a minimum.

5. The method defined in the preceding claim characterized by the additional step of stepping-down the frequency of the response to a substantially lower value before making the product measurements, said step-down being equal for all such product measurements.

6. In combination, an antenna system comprising a unitary combination of an open and a loop antenna, said open antenna being parallel with the plane of said loop, means for orientating such system about a horizontal and a vertical axis independently, and means for measuring the product of the responses of said antennæ to an incoming wave for any desired orientation of such system about either of its axes.

7. The combination specified in the preceding claim comprising additionally, means between said antenna and said measuring means for substantially stepping-down the frequency of response of said antennæ.

JOHN C. SCHELLENG.